No. 792,708. PATENTED JUNE 20, 1905.
J. H. KAMERER.
EMBROIDERY FRAME.
APPLICATION FILED SEPT. 24, 1904.

WITNESSES
Jos. J. Hosler.
L. M. Bond.

INVENTOR
John H. Kamerer.

BY F. W. Bond
ATTORNEY

No. 792,708.  
Patented June 20, 1905.

UNITED STATES PATENT OFFICE.

JOHN H. KAMERER, OF HARTVILLE, OHIO, ASSIGNOR OF ONE-HALF TO WILLIAM A. MARTIN, OF AKRON, OHIO.

EMBROIDERY-FRAME.

SPECIFICATION forming part of Letters Patent No. 792,708, dated June 20, 1905.

Application filed September 24, 1904. Serial No. 225,831.

*To all whom it may concern:*

Be it known that I, JOHN H. KAMERER, a citizen of Hartville, in the county of Stark and State of Ohio, have invented certain new and useful Improvements in Embroidery-Frames; and I do hereby declare that the following is a full, clear, and exact description of the same, reference being had to the annexed drawings, and to the numerals of reference marked thereon, in which—

Figure 1:
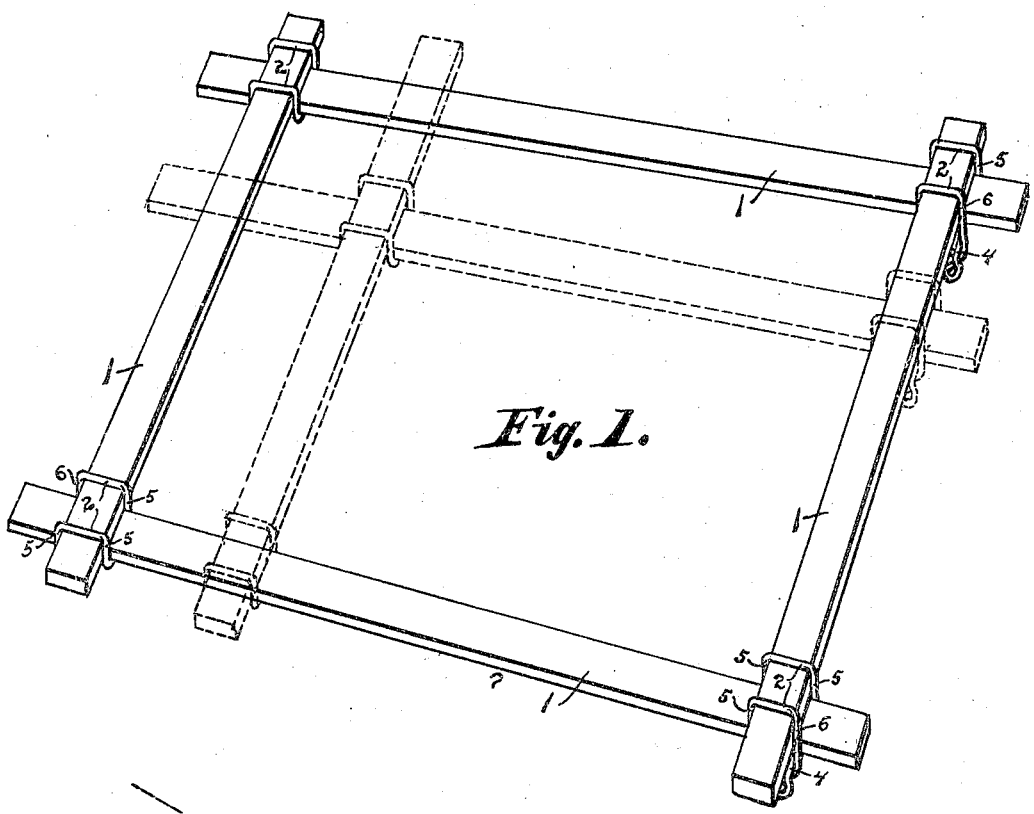
Figure 2:
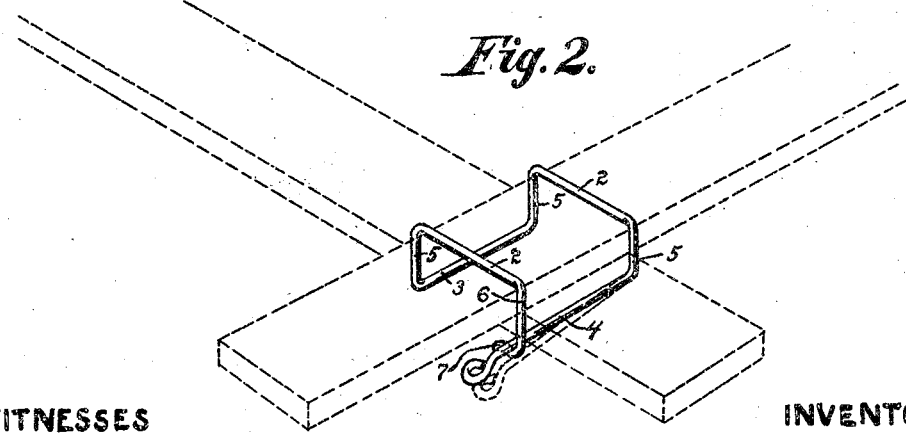

Figure 1 is a view of the frame, showing the different parts properly connected together. Fig. 2 is a view of one of the corner-clips, showing two of the bars in dotted lines.

The present invention has relation to embroidery-frames designed for various kinds of work and adapted to be adjusted to various sizes for different purposes, the size of the frame being limited only to the length of the bars composing the frame.

Similar numerals of reference indicate corresponding parts in both figures of the drawings.

In the accompanying drawings, 1 represents the bars of the frame, which may be formed of any desired length, reference being had to the size of the frame designed to be constructed. The bars are held in proper relation to each other by means of the clips formed of a single piece of wire and bent to form opposite cross portions 2 and 3 and the spring or release bar or portion 4. The portions 2 and 3 are held together by means of the integral portions 5, which integral portions space the opposite portions a sufficient distance to allow the bars 1 to be crossed, as illustrated in the drawings. The portion 6 is provided with the spring-member-engaging hook or part 7. The clips proper and the bars 1 are so formed that when the spring member or bar is engaged with the hook 7 said spring-bar and the portions 2 and 3 will be drawn tightly upon the surface of the bars 1 and the bars 1 held in close contact with each other at their crossing-points.

When it is desired to adjust the frame to different sizes, as illustrated in dotted lines, Fig. 1, the spring bar or portion 4 is detached from the hook 7, at which time the bars 1 are released at their crossing-points and the clips proper can be moved with one of the bars and upon the bar located at right angles to any desired point, and when proper adjustment is made the spring-bar 4 can again be attached to its hook, thereby binding the bars after they have been adjusted.

For convenience in attaching and detaching the spring member 4 from the hooked member of the clip proper said spring member is extended beyond the hook a distance sufficient to be easily operated.

Having fully described my invention, what I claim as new, and desire to secure by Letters Patent, is—

In a frame of the class described, bars, clips located at the crossing-points of the bars, said clips consisting of bar-clamping members located at right angles to each other and held in spaced relation by integral members, one of the integral members provided with a hooked end, and a spring member adapted for engagement with the hooked member, substantially as and for the purpose specified.

In testimony that I claim the above I have hereunto subscribed my name in the presence of two witnesses.

JOHN H. KAMERER.

Witnesses:
J. A. JEFFERS,
F. W. BOND.